United States Patent
Kupsh et al.

(10) Patent No.: US 9,444,775 B2
(45) Date of Patent: Sep. 13, 2016

(54) MULTIPURPOSE INTERNET MAIL EXTENSIONS ("MIME") METADATA FOR GROUP MESSAGING

(71) Applicant: Cellco Partnership, Arlington, VA (US)

(72) Inventors: Jerry M. Kupsh, Concord, CA (US); Kim M. Gutierrez, Alameda, CA (US); Amir Mayblum, Walnut Creek, CA (US); Alice Y. Bain, Morristown, NJ (US); Keith P. Lampron, Lebanon, NJ (US); Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 280 days.

(21) Appl. No.: 14/099,296

(22) Filed: Dec. 6, 2013

(65) Prior Publication Data
US 2015/0163181 A1    Jun. 11, 2015

(51) Int. Cl.
G06F 15/16    (2006.01)
H04L 12/58    (2006.01)

(52) U.S. Cl.
CPC .............. *H04L 51/10* (2013.01); *H04L 51/28* (2013.01); *H04L 51/36* (2013.01)

(58) Field of Classification Search
CPC ............................ H04L 12/58; H04L 51/10
USPC .................................................. 709/203, 206
See application file for complete search history.

(56) References Cited

U.S. PATENT DOCUMENTS

| | | | | |
|---|---|---|---|---|
| 2004/0039789 A1* | 2/2004 | Jackson | ............... | H04L 12/587 709/217 |
| 2009/0279533 A1* | 11/2009 | Strebel | .................... | H04L 12/66 370/352 |
| 2010/0049817 A1* | 2/2010 | Xu | .......... | H04L 51/16 709/206 |
| 2011/0035687 A1* | 2/2011 | Katis | .................... | H04L 12/1827 715/758 |
| 2014/0358521 A1* | 12/2014 | Mikutel | .............. | G06F 17/2705 704/9 |
| 2015/0039706 A1* | 2/2015 | Zilmer | .................... | H04L 51/36 709/206 |
| 2015/0074407 A1* | 3/2015 | Palmeri | ................. | H04L 63/166 713/171 |

* cited by examiner

*Primary Examiner* — Frantz Jean (57) ABSTRACT

A user device may be configured to generate a multipart message (e.g., a multimedia messaging service ("MMS") message). A message part of the multipart message may include conversation metadata that includes information regarding a messaging conversation between the user device and at least one other user device. The message part may include a multipart type indicator (e.g., a Multipurpose Internet Mail Extensions ("MIME") type indicator) that indicates that a type of the at least one part is a type associated with conversation metadata. The user device may output the multipart message to the other user device.

20 Claims, 12 Drawing Sheets

MULTIPURPOSE INTERNET MAIL EXTENSIONS ("MIME") METADATA FOR GROUP MESSAGING

BACKGROUND

In an increasingly networked world, more and more options are becoming available for users to communicate. For example, users may communicate via email, instant messages, short message service ("SMS") messages, multimedia messaging service ("MMS") messages, etc. Users may often desire to have conversations with multiple other users Inherent limitations with certain types of messaging standards may not easily allow enhanced conversation-based features to be provided when these types of messaging standards are used.

DETAILED DESCRIPTION OF PREFERRED EMBODIMENTS

The following detailed description refers to the accompanying drawings. The same reference numbers in different drawings may identify the same or similar elements.

User devices, such as wireless telephones, may allow users to communicate using a variety of different messaging types. For example, user devices may be capable of sending and receiving MMS messages. In some situations, multiple users may carry on a group conversation by sending and/or receiving MMS messages to and/or from multiple other users. MMS messages may be multipart messages, in which different parts of an MMS message may include different types of content. An MMS message may include different parts, each of which may include information for the MMS message. For example, an MMS message may include an information part formatted using the Multipurpose Internet Mail Extensions ("MIME") technique.

Figure 1:
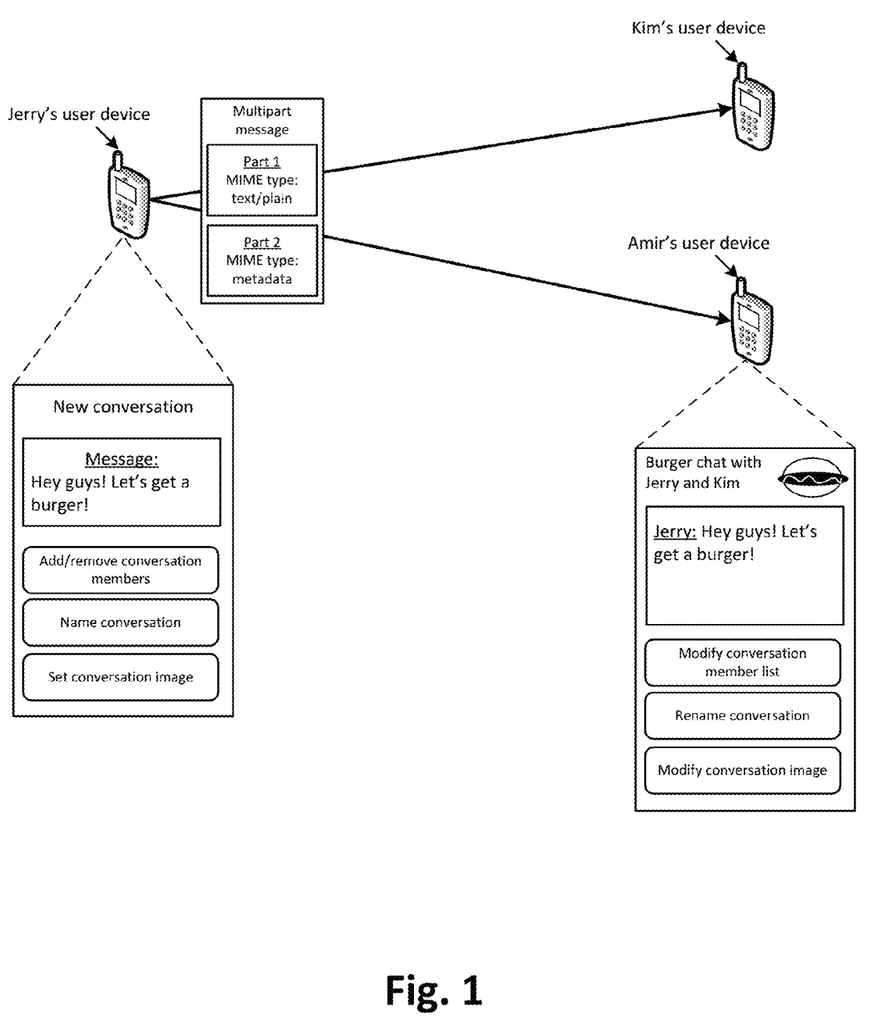
FIG. 1 illustrates an example overview of one or more implementations described herein.

Implementations described herein may allow for MIME techniques to be used to provide enhanced conversation-based features to communication techniques that involve multipart messages (e.g., MMS messages). For example, as shown in FIG. 1, assume that a user ("Jerry") of a particular user device desires to initiate a conversation, via MMS messaging, with two other users ("Amir" and "Kim") of two other user devices. Jerry's user device may present a graphical user interface ("GUI") that allows Jerry to input a message ("Hey guys! Let's go get a burger!"). The GUI may also allow for enhanced conversation-based features. For example, as shown, the GUI may allow options relating to conversation information, such as by adding or removing conversation members, naming the conversation, and adding an image for the conversation.

As described in further detail below, Jerry's user device may generate a multipart message (e.g., an MMS message) based on the information provided via the GUI. As shown, one part of the multipart message ("Part 1") may include a MIME type identifier ("text/plain") that indicates that Part 1 includes plain text. Part 1 may, for example, correspond to the body portion of the message (e.g., "Hey guys! Let's go get a burger!"). As further shown, another part of the multipart message ("Part 2") may include MIME type identifier that indicates that this part includes metadata. Part 2 of the multipart message may include, for example, conversation information provided via the GUI. The multipart message may be sent to user devices associated with the specified conversation members.

The recipient user devices may present the conversation by, for example, presenting the message body and the conversation information specified in the metadata part of the multipart message. For example, as shown, Amir's user device may display a GUI that shows the body of the message ("Jerry: Hey guys! Let's get a burger!"), as well as the conversation information indicated in the metadata part of the multipart message. For example, as shown, the GUI may show a name of the conversation ("Burger chat"), a conversation image (a picture of a hamburger), and names of other conversation members (Jerry and Kim). The GUI, displayed by Amir's user device, may also present options to add or remove conversation members, rename the conversation, and to modify the conversation image. By providing conversation-based features, some implementations may allow for an enhanced user experience when participating in conversations over MMS or other multipart messaging techniques.

Figure 2:
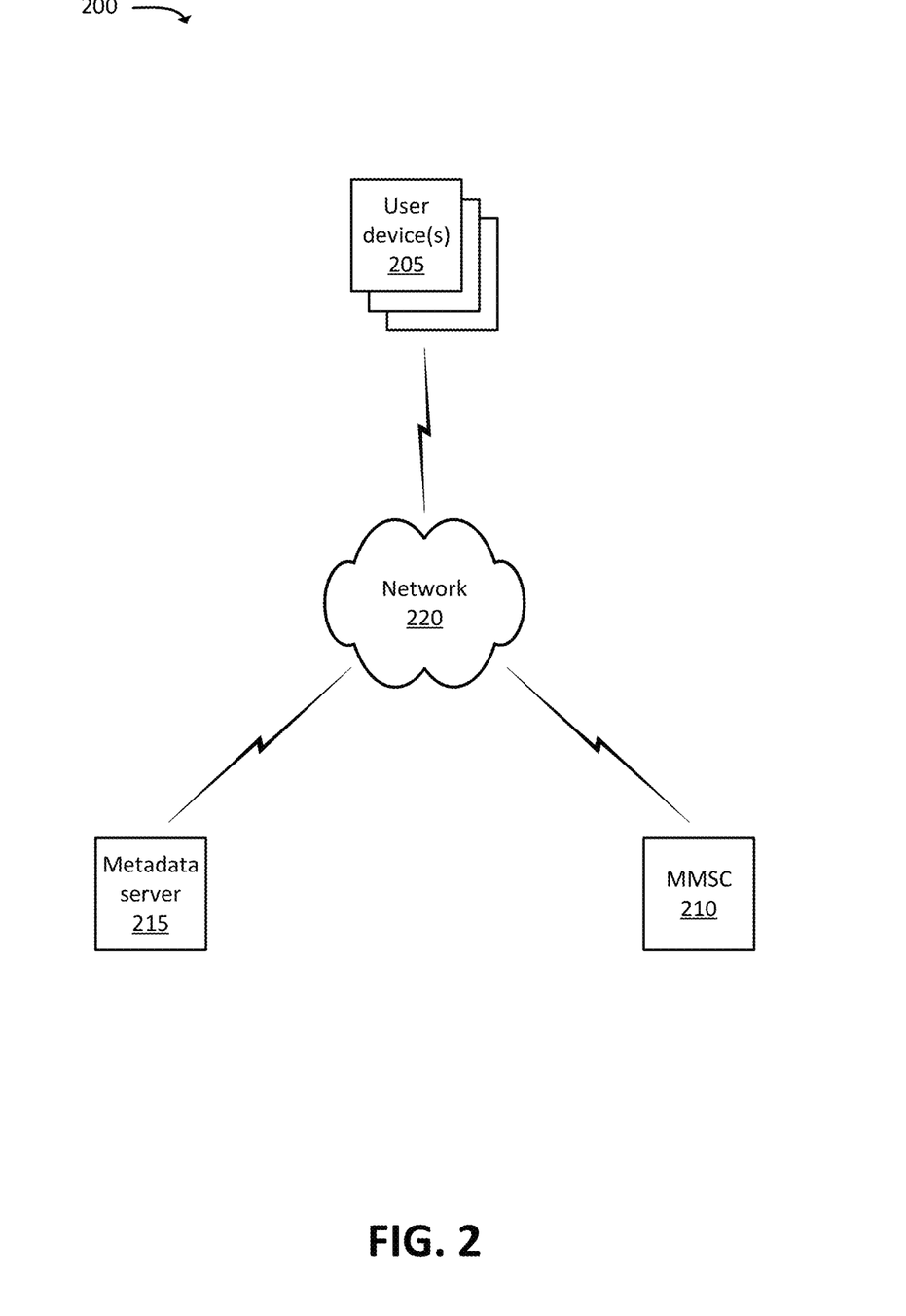
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user devices 205 (sometimes referred to individually as "user device 205"), MMS Center ("MMSC") 210, metadata server 215, and network 220.

User device 205 may include a computation and communication device, such as a wireless mobile communication device that is capable of communicating with one or more networks (e.g., network 220). For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from network 220 via a wireless interface.

MMSC 210 may receive messages (e.g., MMS messages) from user devices 205 and forward the messages to user devices 205 for which the messages are intended. While shown as separate from network 220 in FIG. 2, in some implementations, MMSC 210 may be a portion of network 220. MMSC 210 may, in some implementations, be associated with the same wireless service provider that is associated with one or more user devices 205.

Metadata server 215 may, in some implementations, store conversation information (e.g. a conversation name, a conversation image, a list of members of the conversation, etc.), provided by one or more user devices 205. In this sense, metadata server 215 may serve as a central repository for information regarding MMS conversations between sets of user devices 205. As described further below, the conversation information, stored by metadata server 215, may be retrieved by user devices 205 when user devices 205 receive multipart messages that include metadata, and/or may otherwise be provided to user devices 205.

Network 220 may include one or more wired and/or wireless networks. For example, network 245 may include a wide area network ("WAN"), a metropolitan area network ("MAN"), a telephone network (e.g., the Public Switched Telephone Network ("PSTN")), an ad hoc network, an intranet, a packet data network ("PDN") (e.g., the Internet), a fiber optic-based network, and/or a combination of these or other types of networks. In some implementations, network 220 may include a cellular telecommunications network, such as a long term evolution ("LTE") network, a third generation ("3G") network, etc.

Figure 3:
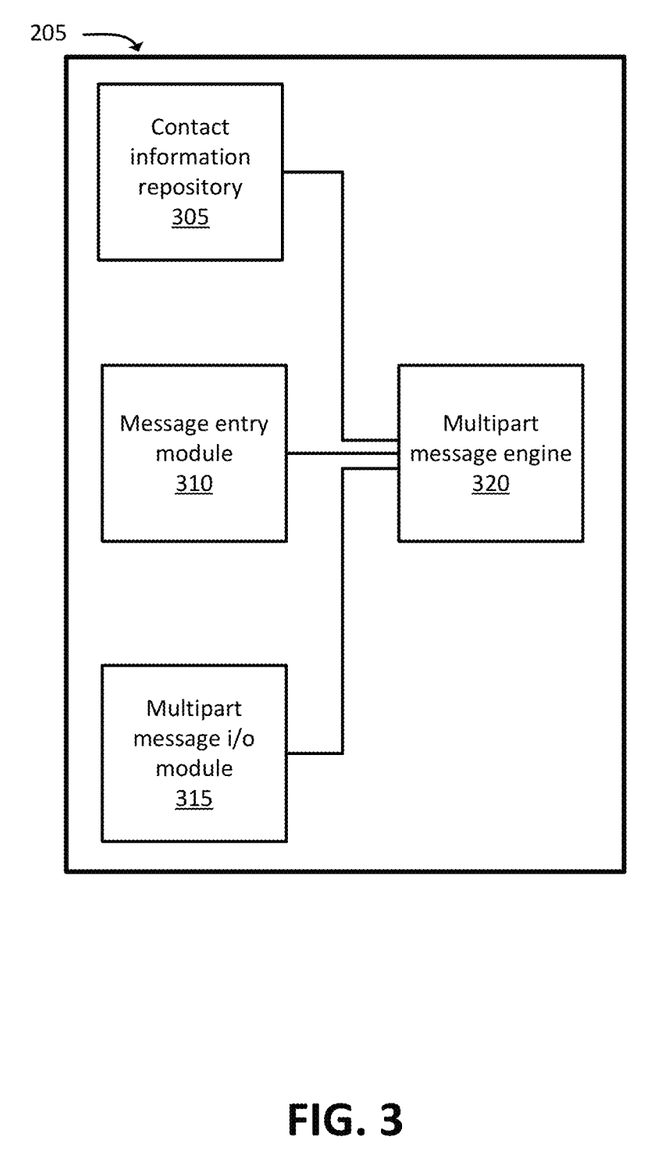
FIG. 3 illustrates example functional components of a user device, in accordance with some implementations.

FIG. 3 illustrates example components of user device 205, in accordance with some implementations. As shown, user device 205 may include contact information repository 305, message entry module 310, multipart message input/output ("i/o") module 315, and multipart message engine 320. In some implementations, user device 205 may include additional, fewer, different, or differently arranged components. Further, in some implementations, the functionality of one of components 305-320 may be performed by a different one of components 305-320.

Contact information repository 305 may store information, such as telephone numbers, pictures, addresses, email addresses, images, etc. regarding contacts. Some or all of the information stored by contact information repository 305 may be provided by, for example, a user associated with contact information repository 305. In some implementations, some or all of the information stored by contact information repository 305 may be automatically generated or retrieved. For example, user device 205 may identify a social networking profile associated with a particular contact (such as by matching the contact's name or other contact information), and may retrieve an image for the contact from the social networking profile. In some implementations, contact information repository 305 may be stored locally on user device 205. In some implementations, contact information repository 305 may be (partially or completely) stored externally from user device 205 (e.g., in a "cloud," a network attached storage ("NAS"), or in another type of external memory device).

Message entry module 310 may receive information regarding message to be sent to one or more other user devices 205. For example, message entry module 310 may present a GUI, via which a user of user device 205 may input text corresponding to the body of the message. The message may, in some implementations, be an MMS message (or another type of multipart message) intended for multiple recipients (sometimes referred to herein as a "group message" or a "group MMS message"). Message entry module 310 may allow the user to input other information regarding the message, or a conversation associated with the message. For example, message entry module 310 may allow the user to input conversation information, such as a name for the conversation, an image for the conversation, members of the conversation, etc.

Multipart message i/o module 315 may receive multipart messages from other user devices 205, and/or may output multipart messages to other user devices 205. For example, multipart message i/o module 315 may output multipart messages, generated by multipart message engine 320, to user devices 205 associated with intended recipients of the messages.

Multipart message engine 320 may generate a multipart message (e.g., a group MMS message), which may include metadata (e.g., conversation metadata). For example, multipart messages generated by multipart message engine 320 may include message text (and/or other information, such as contact information) received from message entry module 310 (e.g., the "body" of a message and contact information manually provided by a user), as well as contact information received from contact information repository 305. For instance, as described below, multipart message engine 320 may retrieve contact information from contact information repository 305 based on information received via message entry module 310 and/or multipart message engine 320. For example, multipart message engine 320 may receive information indicating the name of an intended message recipient, but the recipient's telephone number may be missing. In some implementations, multipart message engine 320 may attempt to retrieve the missing telephone number from contact information repository 305. In some implementations, multipart message engine 320 may additionally, or alternatively, retrieve other contact information from contact information repository 305, such as an image associated with a contact.

The multipart messages, generated by multipart message engine 320, may include one or more message parts that include metadata relating to a conversation (e.g., conversation information, such as conversation name, conversation image, conversation members, etc.). The message parts that include metadata may be designated with a type (e.g., a MIME type) that indicates that the message parts are metadata. The MIME type may, in some implementations, be a proprietary, or non-standard, MIME type.

Figure 4:
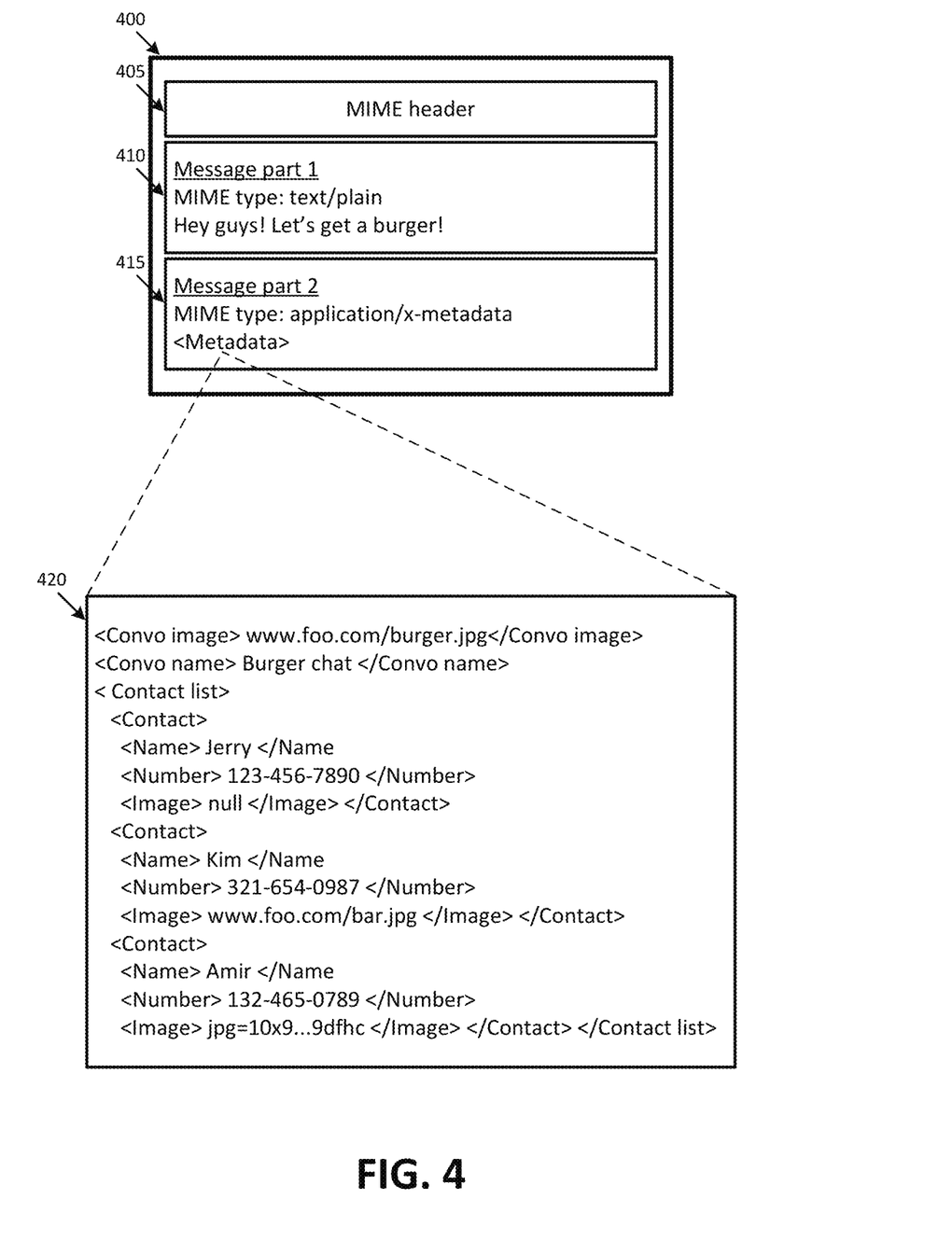
FIGS. 4-6 illustrate example multipart messages that include conversation metadata, in accordance with some implementations.
Figure 5:
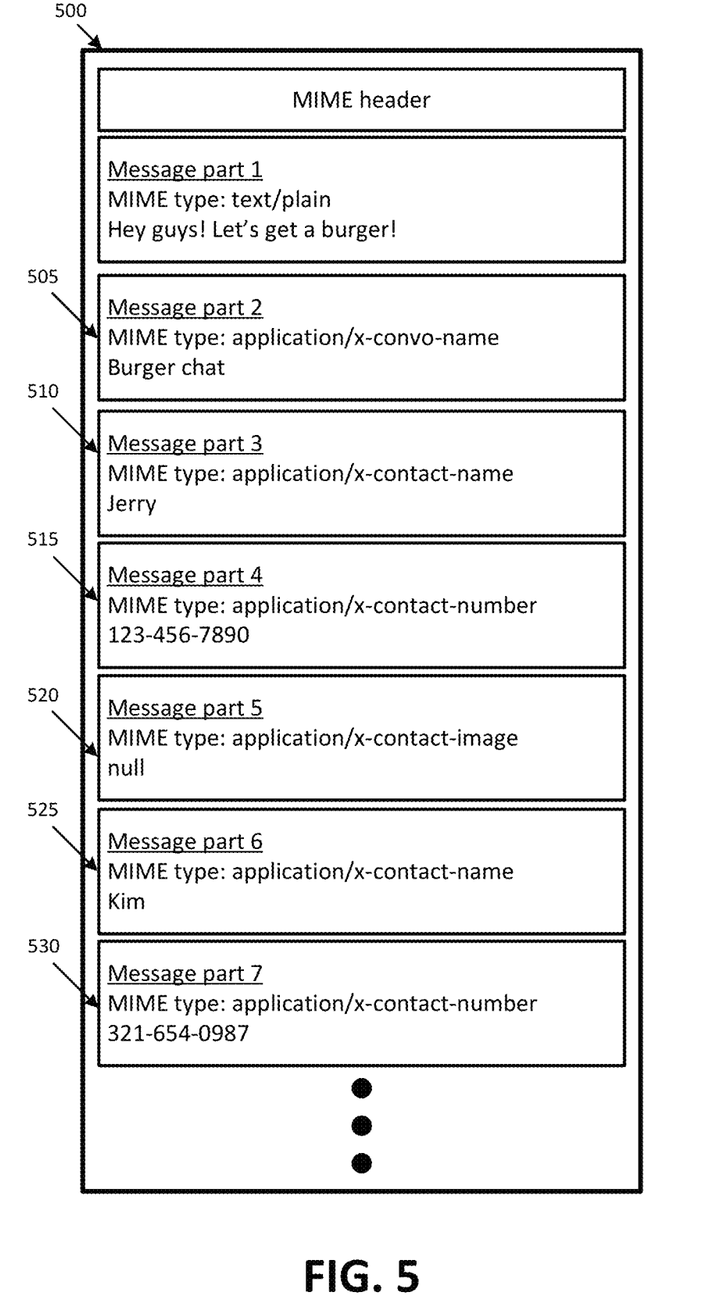
Figure 6:
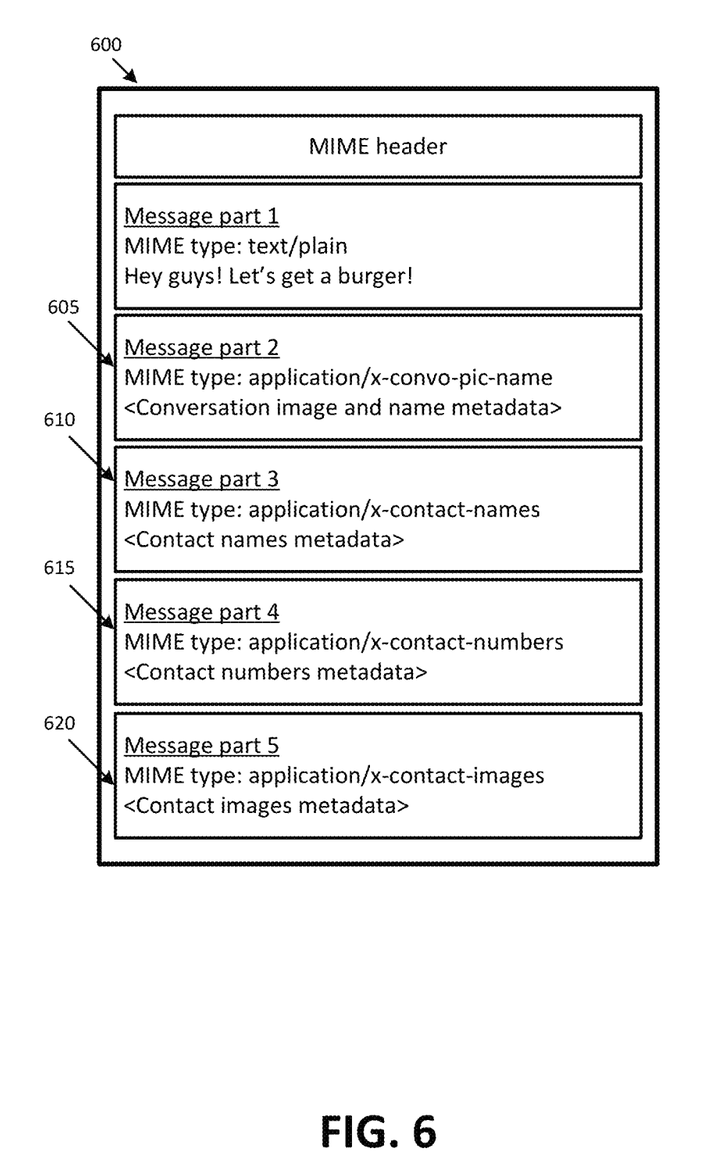

FIGS. 4-6 illustrate example multipart messages (e.g., MMS messages) that may be generated by, for instance, multipart message engine 320. For example, as shown in FIG. 4, multipart message 400 may include MIME header 405, and two message parts 410 and 415 (shown in as "Message part 1" and "Message part 2," respectively). MIME header 405 may indicate that message 400 is a multipart message that uses the MIME standard. MIME header 405 may also, or additionally, indicate a structure of message 400 (e.g., a "multipart/mixed" structure, a "multipart/alternative" structure, another "multipart" structure, etc.). Based on the structure indicated by MIME header 405, message 400 may be interpreted (e.g., by a recipient of message 400) as having message parts 410 and 415.

Message part 410 may correspond to the "body" of message 400. For example, message part 410 may include a MIME header indicating that the MIME type of message part 410 is text (e.g., "text/plain"). As shown, message part 410 may also include the text of the body of message 400 ("Hey guys! Let's get a burger!"), which may correspond to user input provided via message entry module 310.

Message part 415 may correspond to metadata (such as conversation metadata) associated with message 400. For example, message part 415 may include a MIME header indicating that the MIME type of message part 415 is conversation metadata (e.g., "application/x-metadata"). In the example shown in FIG. 4, the metadata may be represented in Extensible Markup Language ("XML") format. For instance, the metadata in message part 415 may include text corresponding to an XML format, and/or may include a reference (such as a link) to an XML file that includes the metadata.

Metadata 420 (which, as mentioned above, may be included within message part 415 and/or may be referenced by message part 415) may include conversation metadata received and/or identified by multipart message engine 320. For example, metadata 420 may include information regarding a conversation image (indicated by the XML tag "<Convo image>") and a conversation name (indicated by the XML tag "<Convo name>"). Metadata 420 may also include a list of contacts (indicated by the XML tag "<Contact>") who are members of the conversation (indicated by the XML tag "<Contact list>"). Each contact may be listed with a contact name (indicated by the XML tag "<Name>"), telephone number (indicated by the XML tag "<Number>"), and a contact image (indicated by the XML tag "<Image>"). As shown, information for some items may not be present (e.g., no image is associated with the contact "Jerry"). Also, as shown, some of the information may include references to external resources (e.g., "<Convo image>" includes a link to an image located at the Uniform Resource Locator ("URL") www.foo.com/burgerjpg).

In some implementations, some of the information may include raw data, such as raw image data. For example, as shown, the image data for the contact "Amir" may include raw data, which may appear as a string of characters. The raw data may represent the image when encoded with a particular encoding scheme (e.g., a Graphics Interchange Format ("GIF") encoding scheme, a Joint Photographic Experts Group ("JPEG") encoding scheme, etc.). The raw data may, in some implementations, include a type identifier ("jpg="), which may be used by a recipient of message 400 in order to decode the raw data.

FIG. 5 illustrates another example multipart message 500, which may be generated by multipart message engine 320. Message 500 may include the same information (e.g., the same message body and conversation metadata) as included in message 400, arranged in a different manner. For example, message 500 may forgo the use of XML or similar data representation standards to represent the metadata. Message 500 may include a different part for each item of metadata. Multiple message parts of message 500 may thus include conversation metadata (or references to conversation metadata), and multipart type indicators (e.g., MIME type indicators) to indicate the type of metadata included in (or referenced by) the message parts. For example, message part 505 may include a MIME type indicator (e.g., "application/x-convo-name") that indicates that message part 505 relates to a conversation name, message part 510 may include a MIME type indicator (e.g., "application/x-contact-name") that indicates that message part 510 relates to a contact name, message part 515 may include a MIME type indicator (e.g., "application/x-contact-number") that indicates that message part 515 relates to a contact number, and message part 520 may include a MIME type indicator (e.g., "application/x-contact-image") that indicates that message part 520 relates to a contact image. Thus, message parts 510-520 may correspond to one particular contact. Message parts 525 and 530 (and other message parts, not shown) may correspond to another contact.

FIG. 6 illustrates another example multipart message 600, which may be yet another possible arrangement of a multipart message that may be generated by multipart message engine 320. As shown, message 600 may include different message parts for different groups of data. For example, message part 605 may include a MIME type indicator ("application/x-convo-pic-name") indicating that message part 605 includes (or references) a conversation image and a conversation name, message part 610 may include a MIME type indicator ("application/x-contact-names") indicating that message part 610 includes (or references) a list of contact names, message part 615 may include a MIME type indicator ("application/x-contact-numbers") indicating that message part 615 includes (or references) a list of contact numbers, and message part 620 may include a MIME type indicator ("application/x-contact-images") indicating that message part 620 includes (or references) a set of contact images.

While FIGS. 4-6 illustrate examples of multipart messages that may be generated by multipart message engine 320, in practice, additional, different, or differently arranged multipart messages may be generated by multipart message engine 320. Further, in some implementations, while XML may be used, data may be represented in different, or additional ways in multipart messages generated by multipart message engine 320.

Returning to FIG. 3, multipart message engine 320 may, in some implementations, receive multipart messages from other user devices 205 (e.g., via multipart message "i/o" module 315). Multipart message engine 320 may parse the received multipart messages by, for example, identifying conversation metadata based on MIME types included in the multipart messages. That is, multipart message engine 320 may be configured to interpret non-standard or proprietary MIME types (such as the example MIME types shown in FIGS. 4-6) that indicate conversation metadata. In instances where multipart messages include links to conversation metadata, multipart message engine 320 may retrieve the linked metadata (e.g., by accessing a web server, such as metadata server 215). Multipart message engine 320 may, in some implementations, update information stored in contact information repository 305, based on received conversation metadata.

For instance, multipart message engine 320 may add contact information that was not previously present in contact information repository 305. For example, multipart message engine 320 may add a telephone number or an image to a contact, present in contact information repository 305, for which the telephone number and/or the image were not present in contact information repository 305. In some instances, multipart message engine 320 may add new contacts to contact information repository 305, when the contacts are not present in contact information repository 305. In some implementations, multipart message engine 320 may present a prompt to a user of user device 205 requesting permission to modify the information stored in contact information repository 305 (e.g., to add, remove, or change information in contact information repository 305).

Figure 7:
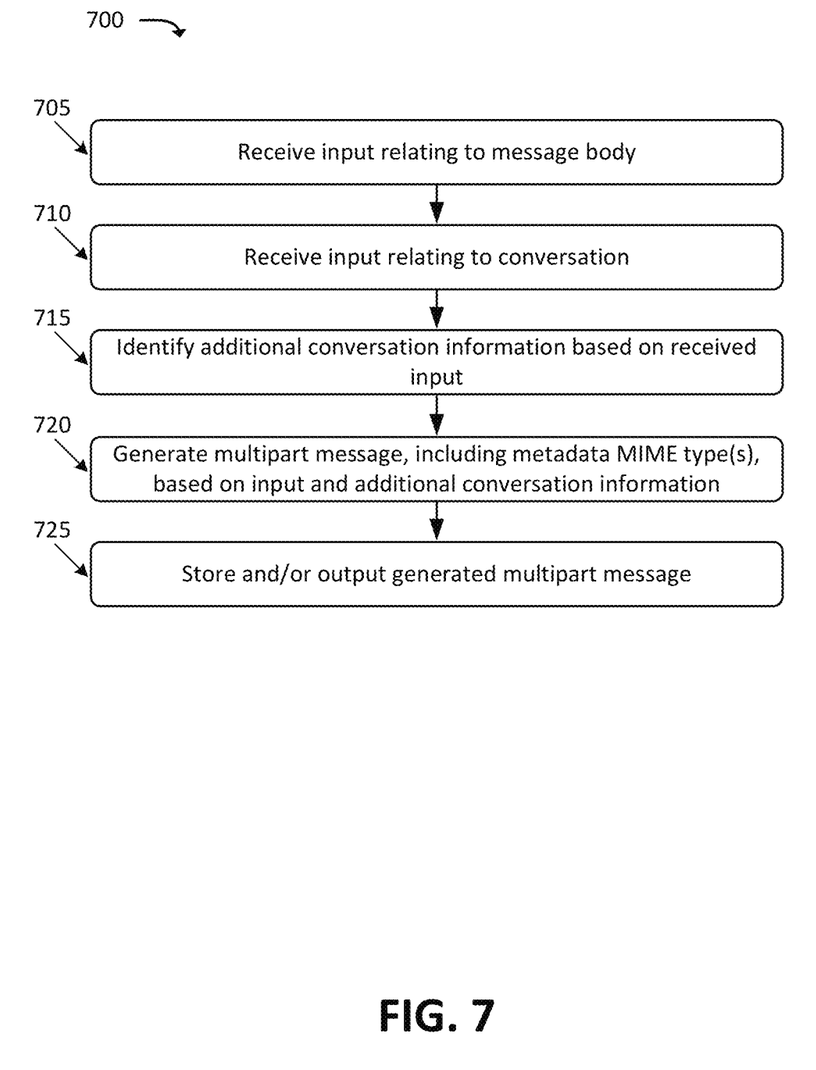
FIG. 7 illustrates an example process for generating a multipart message that includes conversation metadata.

FIG. 7 illustrates an example process 700 for generating a multipart message that includes conversation metadata. In some implementations, process 700 may be performed by user device 205 (e.g., by one or more of modules 305-320). In other implementations, process 700 may be performed by one or more other devices in conjunction with, or in lieu of, user device 205.

Process 700 may include receiving input relating to a message body (block 705). For example, as described above with respect to contact information repository 305, user device 205 may receive the body of the message. Referring to the example shown in FIG. 1, the message body may be "Hey guys! Let's get a burger!"

Process 700 may also include receiving input relating to a conversation (block 710). For example, as also described above with respect to contact information repository 305, user device 205 may receive information identifying a set of contacts (e.g., names of contacts to whom the message should be sent), telephone numbers associated with the contacts, contact images, a conversation image, a conversation name, etc.

Process 700 may further include identifying additional conversation information based on the received input (block 715). For example, as described above with respect to multipart message engine 320, user device 205 may identify additional information associated with, for example, the contacts. For instance, multipart message engine 320 may identify contact images or phone numbers stored in contact information repository 305, may retrieve images or numbers from social network profiles or from other sources, etc. The additional conversation information may additionally, or alternatively, include information indicating an identity of the user who initiated the conversation (e.g., "Created by"), and/or a date and time the conversation was created (e.g., "Time created" or "Date created").

Process 700 may additionally include generating a multipart message, including one or more MIME types, based on the input and the additional conversation information (block 720). For example, as described above with respect to multipart message engine 320, user device 205 may generate a multipart message (e.g., an MMS message) based on the input received at blocks 710 and 715, and/or the additional information identified at block 720. The multipart message may include information identifying intended recipients of the message, and, as described above, may include MIME type indicators to identify types of metadata included in different parts of the multipart message. Some examples of how the multipart message may be arranged are described above with respect to FIGS. 4-6.

Process 700 may also include storing and/or outputting the generated multipart message (block 725). For example, as described above with respect to multipart message i/o module 315, user device 205 may output the generated multipart message to one or more other user devices 205 (e.g., user devices associated with intended recipients of the multipart message). In some implementations, user device 205 may store the message (e.g., in a "sent messages" folder, an "outbox," etc.).

Figure 8:
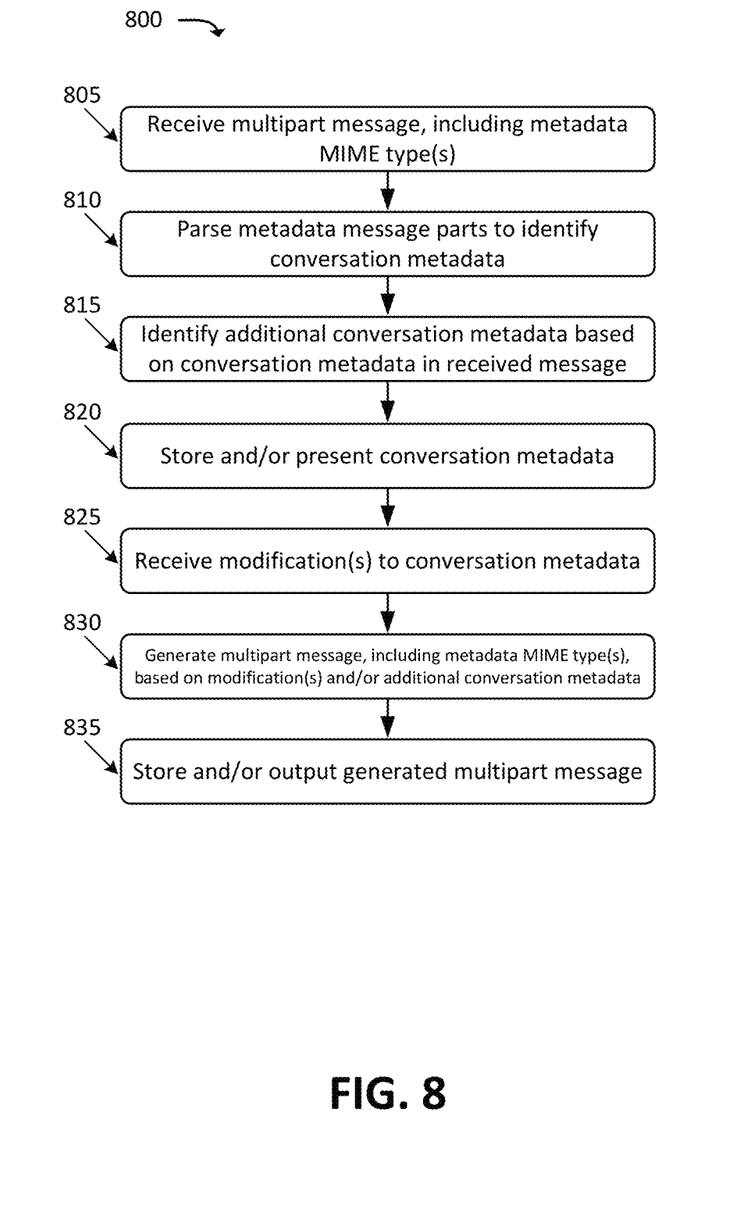
FIG. 8 illustrates an example process for processing an incoming multipart message that includes conversation metadata.

FIG. 8 illustrates an example process 800 for modifying conversation information associated with a received multipart message. In some implementations, process 800 may be performed by user device 205 (e.g., by one or more of modules 305-320). In other implementations, process 800 may be performed by one or more other devices in conjunction with, or in lieu of, user device 205

Process 800 may include receiving a multipart message that includes metadata one or more MIME type indicators (block 805). For example, as described above with respect to multipart message i/o module 315, user device 205 may receive a multipart message generated by another user device 205 (e.g., by a multipart message engine 320 associated with the other user device 205). The received multipart message may include one or more parts that include conversation metadata, and may include MIME type identifiers indicating that these parts include conversation metadata. The message may be similar to one of the example messages shown in FIGS. 4-6, for instance.

Process 800 may also include parsing metadata message parts, of the multipart message, to identify conversation metadata in the message (block 810). For instance, multipart message engine 320 may identify a structure of the received multipart message based on a top-level MIME header (e.g., MIME header 405 of message 400, in FIG. 4). Identifying the structure may allow multipart message engine 320 to determine how to identify parts of the message (e.g., the top-level MIME header may indicate delimiters between parts of the message). Multipart message engine 320 may identify the metadata in the message by parsing the various parts of the message. For instance, multipart message engine 320 may analyze the MIME header of each part to identify what type or types of metadata are included in each part.

Process 800 may further include identifying additional conversation metadata based on the conversation metadata in the received message (block 815). For example, assume that some of the metadata in the received message is missing some information. For instance, the metadata may include the name of a contact, but may be missing a telephone number for the contact. Multipart message engine 320 may locate the contact, by name, in contact information repository 305, and may identify a telephone number, stored in contact information repository 305, for the contact. Multipart message engine 320 may, in some implementations, identify other contact information (e.g., a contact image) in contact information repository 305 or from another source. The additional conversation metadata may additionally, or alternatively, include information identifying one or more users who have made modifications to the conversation (e.g., by adding or deleting conversation members, adding or removing a conversation image, modifying a conversation name, etc.) ("Modified by"), and/or a date and time at which the conversation was modified ("Date modified" or "Time modified").

Process 800 may additionally include storing and/or presenting the conversation metadata (block 820). For example, user device 205 may display the received message, along with some or all of the received conversation metadata and/or the additional conversation metadata. For instance, user device 205 may present a messaging GUI that displays the message and the conversation metadata. For instance, the messaging GUI may display the body of the received message, the conversation image, a list of the members of the conversation, etc. In some implementations, the GUI may present options, such as "modify conversation member list," "rename conversation," "modify conversation icon," etc.

Process 800 may also include receiving one or more modifications to the conversation metadata (block 825). For example, user device 205 may receive a selection of one of the above-mentioned options ("modify conversation member list," "rename conversation," "modify conversation icon," etc.). A user of user device 205 may, for example, provide modifications to existing metadata (e.g., may change a telephone number of a contact), may add new metadata (e.g., add a new contact), and/or may remove some or all of the metadata (e.g., may remove a contact from the conversation member list).

Figure 9:
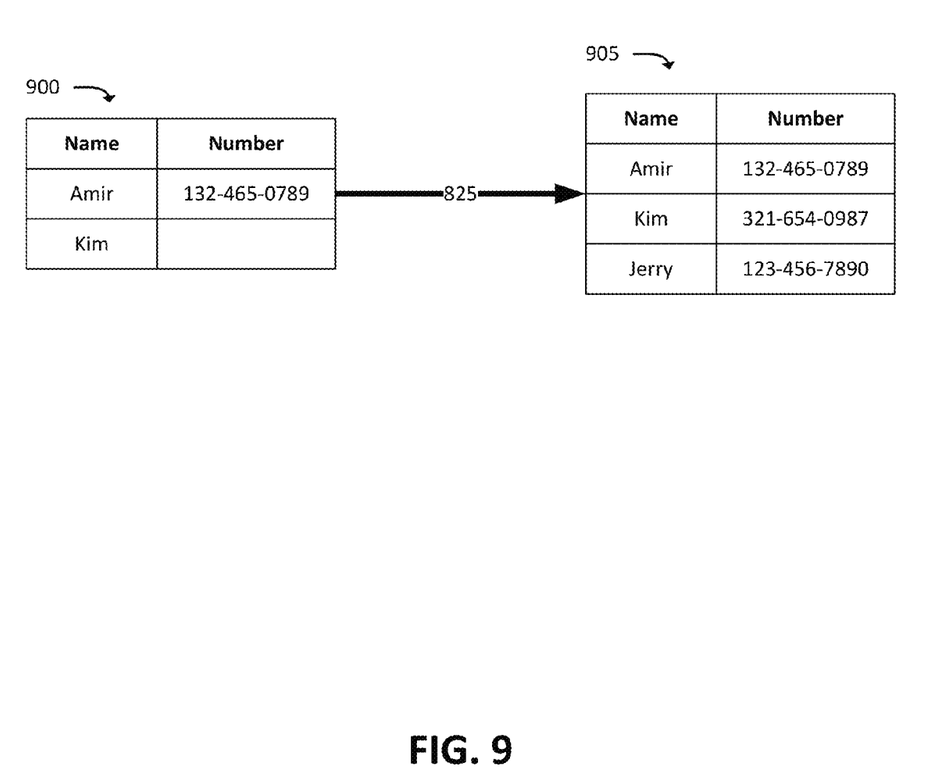
FIG. 9 illustrates an example of additional conversation information that may be identified and included as conversation metadata.

FIG. 9 illustrates an example of metadata before and after the modification at block 825. For example, metadata 900 may correspond to metadata included in the message received at block 805, while metadata 905 may correspond to metadata after being modified by a user. As shown, the user may add a missing telephone number for the contact "Kim," and may add the contact "Jerry" (including a telephone number for the contact "Jerry").

While illustrated in the context of block 825, in some implementations, FIG. 9 may conceptually illustrate additional conversation metadata identified at block 815. For example, assume that the message was received (at block 805) from the telephone number "123-456-7890," and further assume that the metadata does not include contact information that corresponds to this telephone number. Multipart message engine 320 may identify that the telephone number is present in contact information repository 305, and may further identify that a contact named "Jerry" is associated with the telephone number. Multipart message engine 320 may thus identify that the sender of the message is the contact "Jerry," and may identify (at block 815) this contact as additional conversation metadata.

Returning to FIG. 8, process 800 may further include generating a multipart message, including metadata MIME type indicators, based on the one or more modifications and/or the additional conversation metadata (block 830). For instance, as described above with respect to multipart message engine 320, user device 205 may generate a multipart message that includes metadata and associated MIME type indicators, based on the additional conversation metadata (identified at block 815) and/or the modifications (received at block 825). In some implementations, the multipart message may additionally, or alternatively, include message body text (e.g., a reply inputted by a user of user device 205). Process 800 may additionally include storing and/or outputting the generated multipart message (block 835).

Figure 10:
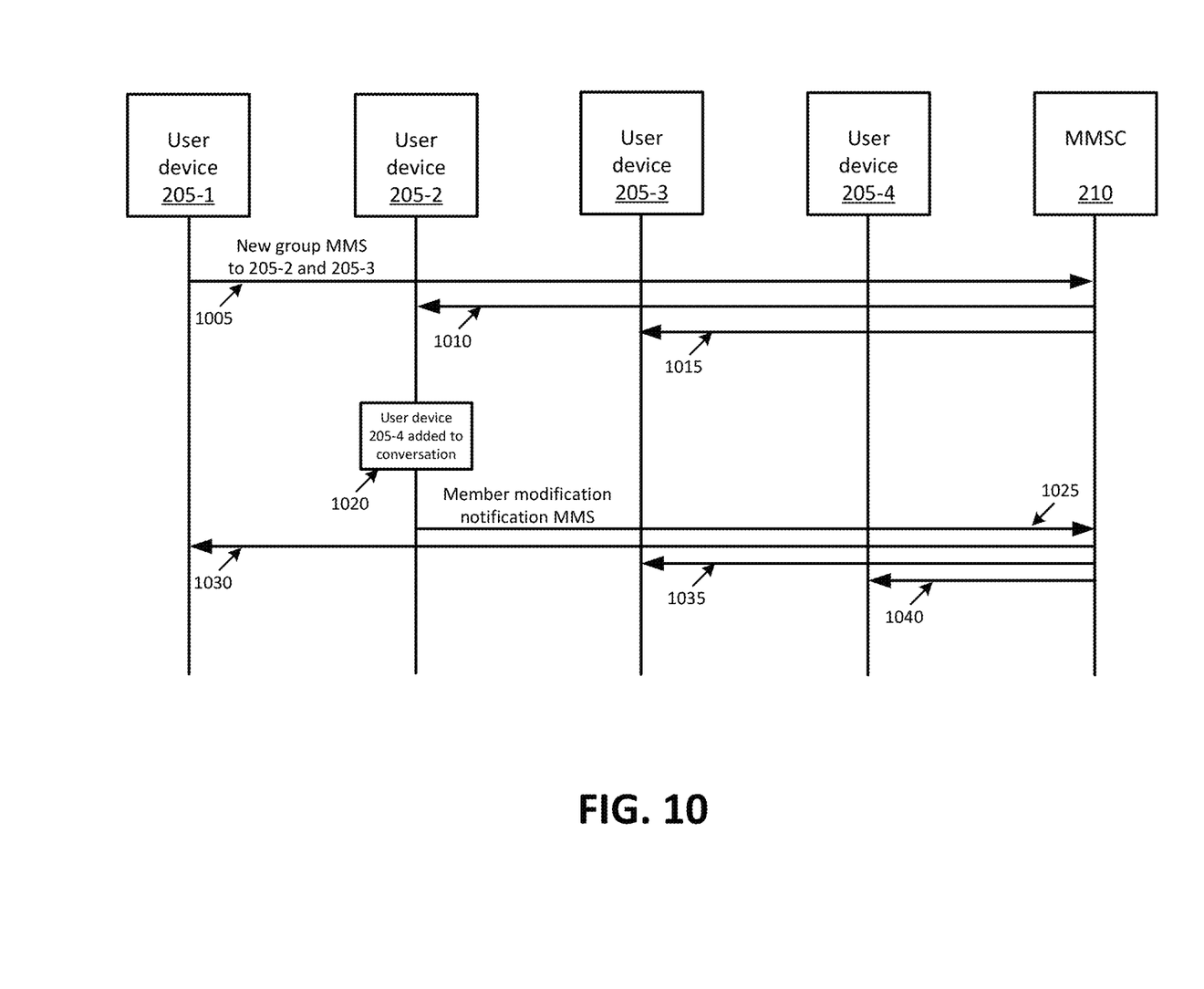
FIGS. 10 and 11 illustrate example signal flows involving multipart messages that include conversation metadata.

FIG. 10 illustrates an example signal flow for a multi-participant MMS conversation, in accordance with some implementations described herein. For instance, user device 205-1 may generate an MMS message to be sent to user devices 205-2 and 205-3. The MMS message may include conversation metadata, including MIME type identifiers, as described above.

User device 205-1 may output (at 1005) the group MMS message to user devices 205-2 and 205-3 by, for example, sending the group MMS message to MMSC 210. MMSC 210 may forward the message (at 1010 and 1015, respectively) to user devices 205-2 and 205-3. As shown in FIG. 10, a user of user device 205-2 may add user device 205-4 to the conversation (at 1020).

Multipart message engine 320, of user device 205-2, may generate an MMS message that includes metadata that indicates the update. For example, the MMS message may include only the updated conversation metadata (e.g., not the other conversation metadata that was not updated), and may include an indicator that the MMS message includes an update. In some implementations, the MMS message may include all of the conversation metadata (e.g., the conversation metadata included in the message received at 1010, as well as any additional conversation metadata identified or received by user device 205-2). In some implementations, the MMS message may additionally include message body text inputted at user device 205-2 (e.g., a reply to the message received at 1010).

User device 205-2 may output (at 1025) the MMS message (which includes information regarding the modification to the conversation members) to MMSC 210, which may forward (at 1030-1040, respectively) the MMS message to user devices 205-1, 205-3, and 205-4. In some implementations, if the MMS message does not include a message body, user devices 205-1, 205-3, and/or 205-4 may be configured to handle the MMS differently than standard MMS messages. For example, user devices 205-1, 205-3, and/or 205-4 may forgo alerting users that an MMS message has been received. For example, the users may not need or desire to be notified merely when conversation information has been changed. In other implementations, user devices 205-1, 205-3, and/or 205-4 may alert users that an MMS message has been received, which includes modifications to the existing conversation.

Figure 11:
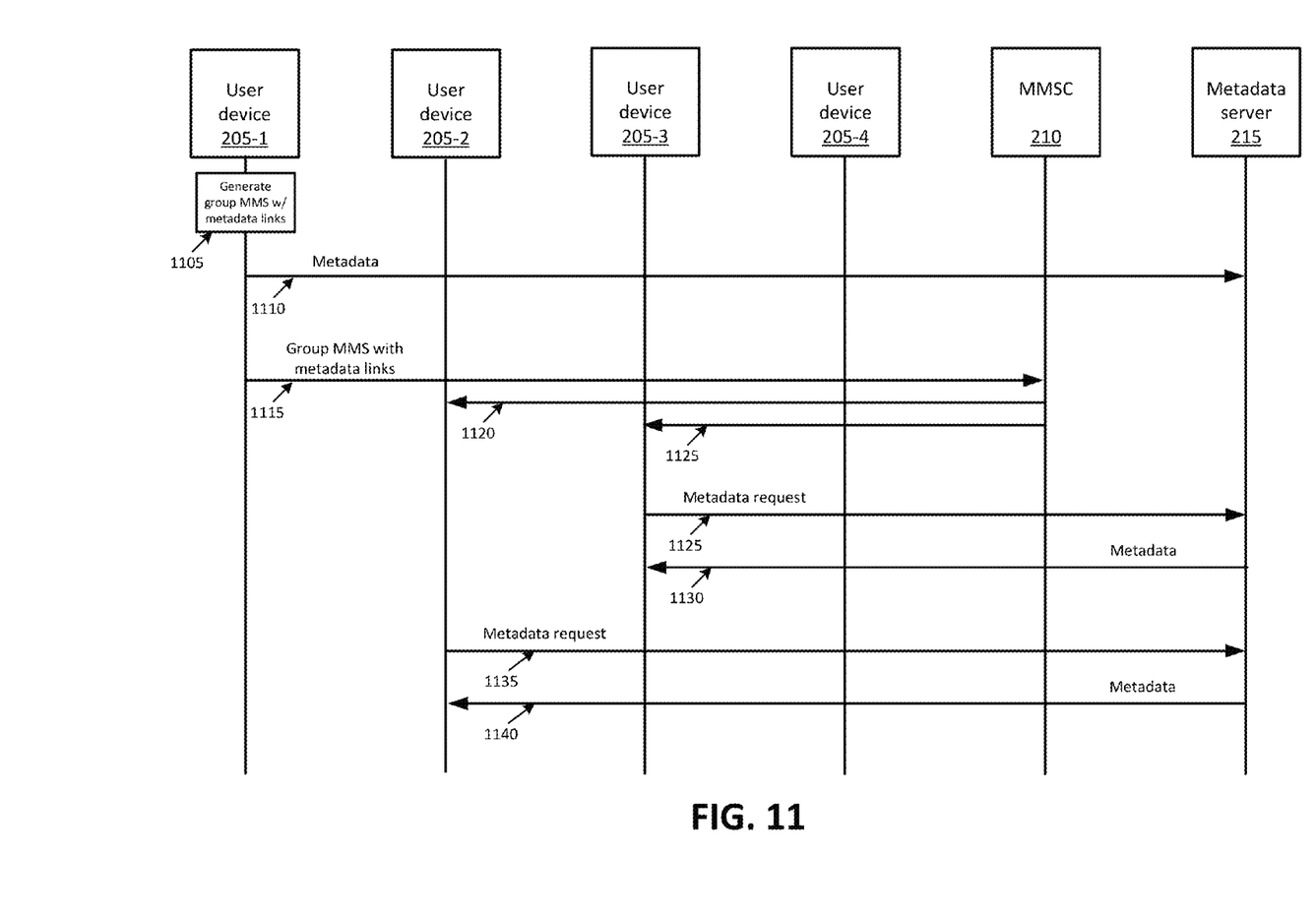

FIG. 11 illustrates another example signal flow for a multi-participant MMS conversation. For instance, as shown, user device 205-1 may generate (at 1105) a group MMS message that includes metadata with links to external resources (e.g., images and/or other resources stored by metadata server 215). In some implementations, for instance, a user may specify an image stored by metadata server 215 (e.g., may provide a reference, such as a URL, to the image). In some implementations, the user may specify an image stored at user device 205-1 or another location (e.g., another device), and user device 205-1 may retrieve the image and output the image (at 1110) to metadata server 215. In this sense, while it may appear to the user that the message to be output includes the specified image, the message may actually include a link to the image. Not including the image itself in the message may conserve resources (e.g., network and/or processing resources) of a provider's network (e.g., reduce the load on MMSC 210). Further, including a link to the image, instead of the image, may allow for faster delivery of the message to the intended recipients.

User device 205-1 may output the generated message toward the intended recipients (e.g., user devices 205-2 and 205-3). For instance, user device 205-1 may output (at 1115) the generated message to MMSC 210, which may forward (at 1120 and 1125, respectively) the message to user devices 205-2 and 205-3. When user devices 205-2 and 205-3 receive the message, user devices 205-2 and 205-3 may retrieve (at 1125-1140) the metadata from metadata server 215. For example, upon receipt, user devices 205-2 and 205-3 may parse the metadata in the message to identify the links to the metadata, and may send metadata requests (at 1125 and 1135) to metadata server 215. In some implementations, instead of upon receipt, user devices 205-2 and/or 205-3 may retrieve the linked metadata at another time (e.g., when a user attempts to view the message).

Figure 12:
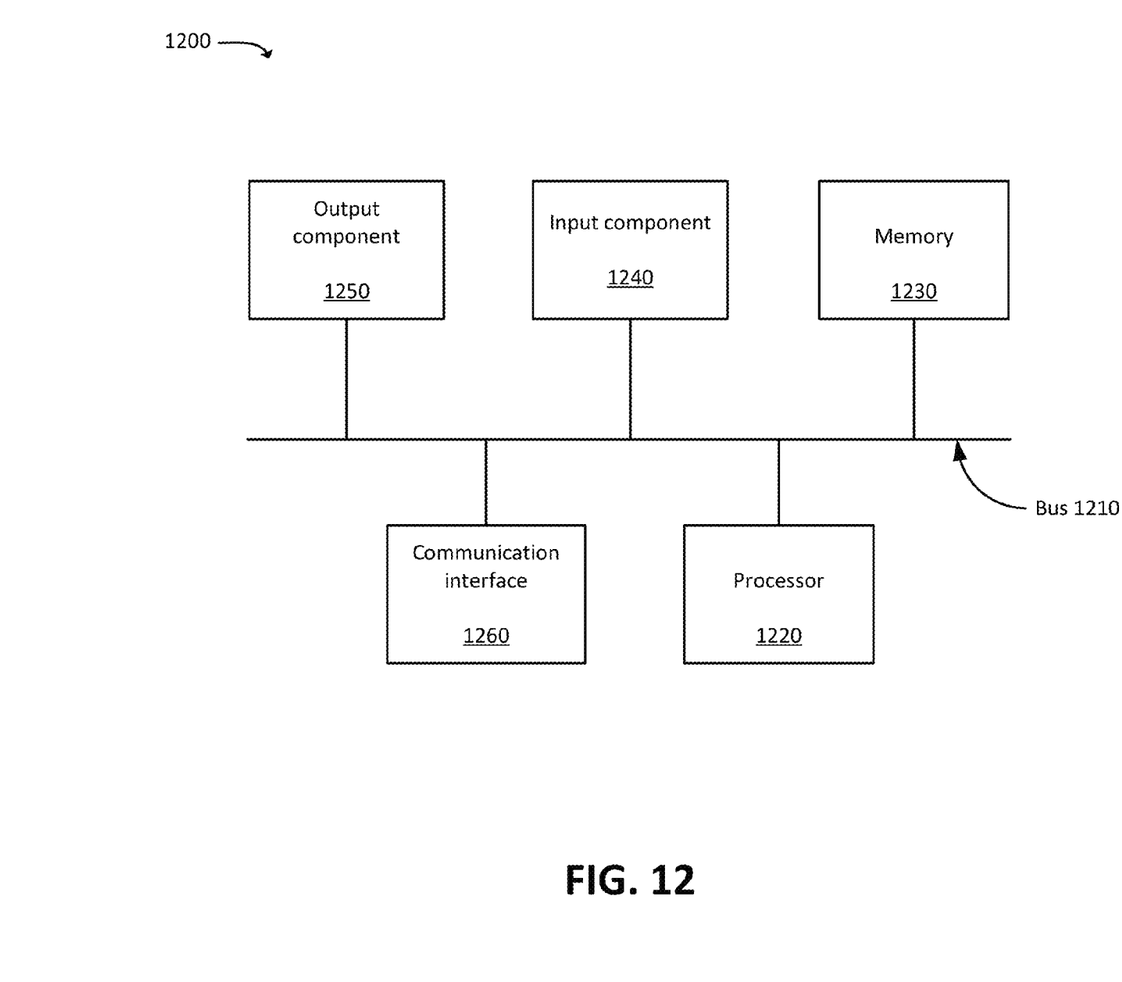
FIG. 12 illustrates example components of a device, which may be used in one or more implementations described herein.

FIG. 12 is a diagram of example components of device 1200. One or more of the devices described above (e.g., with respect to FIGS. 1-3, 10, and 11) may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, a "Wi-fi" radio, a cellular radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signals have been described with regard to FIGS. 7, 8, 10, and 11, the order of the blocks and/or signals may be modified in other implementations. Further, non-dependent blocks and/or signals may be performed in parallel. Also, additional blocks and/or signals may be present, either before, after, or in between the blocks and/or signals shown in these figures.

Also, while the above description describes examples in the context of MMS messages, in some implementations, other types of messages may be used. Further, while some example types of conversation metadata (e.g., contact names, contact telephone numbers, contact images, conversation images, and conversation names) are described above, in practice, other types of conversation metadata may be used. Additionally, while example user interfaces are described above (e.g., with respect to FIG. 1), in practice, other types of user interfaces may be used.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
receiving, by a user device, information regarding a messaging conversation between the user device and at least one other user device, the information including:
a conversation image associated with the messaging conversation, or
a conversation name associated with the messaging conversation;
generating, by the user device, a multipart message, at least one message part of the multipart message including conversation metadata that is based on the information regarding the messaging conversation,
the at least one message part including a multipart type indicator indicating that a type of the at least one message part is a particular type that is associated with conversation metadata,
the conversation metadata including at least one of:
the conversation image associated with the messaging conversation, or
the conversation name associated with the messaging conversation; and
outputting, by the user device, the multipart message to the at least one other user device.

2. The method of claim 1, wherein the multipart type indicator includes a Multipurpose Internet Mail Extensions ("MIME") type indicator.

3. The method of claim 1, wherein the multipart message is a multimedia messaging service ("MMS") message.

4. The method of claim 1, wherein the multipart message further includes at least one other message part that corresponds to a body of the multipart message, the at least one other message part having a multipart type indicator that indicates a "plain text" type for the at least one other message part.

5. The method of claim 1, wherein the information regarding the messaging conversation includes at least one of:
a contact name associated with the at least one other user device,
a telephone number associated with the at least one other user device, or
a contact image associated with the at least one other user device.

6. The method of claim 1, further comprising:
receiving information identifying a contact name associated with the at least one other user device;
locating a contact, in a contact repository associated with the user device, the contact being located based on the contact name; and identifying additional contact information, in the contact repository, associated with the located contact,
wherein the conversation metadata, included in the generated multipart message, further includes the additional identified contact information.

7. The method of claim 6, further comprising:
obtaining user authorization to include the additional identified contact information in the conversation metadata.

8. The method of claim 1, wherein the conversation metadata includes information in an extensible markup language ("XML") format.

9. The method of claim 1, wherein the multipart message is a first multipart message, wherein the user device is a first user device, the method further comprising:
receiving, from a second user device, a second multipart message, the second multipart message comprising:
a first message part that includes the multipart type indicator, indicating that the first message part is the particular type that is associated with conversation metadata, and
a second message part that includes a message body of the second message;
parsing the first message part to identify the conversation metadata associated with the first message part;
determining based on the conversation metadata, associated with the first message part of the second message, that the second message is associated with the same messaging conversation metadata as the first message;
displaying, in a user interface that is associated with the messaging conversation, the message body of the second message.

10. A user device, comprising:
a memory device configured to store a plurality of processor-executable instructions; and
a processor configured to execute the plurality of processor-executable instructions, wherein executing the plurality of processor-executable instructions causes the processor to:
generate a multipart message, at least one message part of the multipart message including conversation metadata that includes information regarding a messaging conversation between the user device and at least one other user device, the at least one message part including a multipart type indicator indicating that a type of the at least one message part is a type associated with conversation metadata;
output the multipart message to the at least one other user device.

11. The user device of claim 10, wherein the multipart type indicator includes a Multipurpose Internet Mail Extensions ("MIME") type indicator.

12. The user device of claim 10, wherein the multipart message is a multimedia messaging service ("MMS") message.

13. The user device of claim 10, wherein the multipart message further includes at least one other message part that corresponds to a body of the multipart message.

14. The user device of claim 10, wherein the information regarding the messaging conversation includes at least one of:
a contact name associated with the at least one other user device,
a telephone number associated with the at least one other user device,
a contact image associated with the at least one other user device,
a conversation image associated with the messaging conversation, and
a conversation name associated with the messaging conversation.

15. The user device of claim 10, wherein executing the plurality of processor-executable instructions causes the processor to:
locate a contact, in a contact repository associated with the user device, the contact being located based on contact name associated with the at least one other user device; and
identify additional contact information, in the contact repository, associated with the located contact,
wherein the conversation metadata, included in the generated multipart message, further includes the additional identified contact information.

16. The user device of claim 10, wherein the conversation metadata includes information in an extensible markup language ("XML") format.

17. A method, comprising:
receiving, by a user device, a multipart message, at least one message part of the multipart message including conversation metadata that includes information regarding a messaging conversation between the user device and at least one other user device,
the at least one message part including a particular multipart type indicator indicating that a type of the at least one message part is a type associated with conversation metadata;
parsing, by the user device and based on the particular multipart type indicator, the multipart message to identify the conversation metadata; and
storing or presenting, by the user device, at least a portion of the identified conversation metadata.

18. The method of claim 17, wherein the particular multipart type indicator indicates that the type associated with the conversation metadata is a type associated with at least one of:
a contact name associated with the at least one other user device,
a telephone number associated with the at least one other user device,
a contact image associated with the at least one other user device,
a conversation image associated with the messaging conversation, or
a conversation name associated with the messaging conversation.

19. The method of claim 17, wherein parsing the multipart message to identify the conversation metadata includes:
determining that the at least one message part includes conversation metadata by identifying that the at least one message part includes the particular multipart type indicator, and
parsing the at least one message part, based on determining that the at least one message part includes conversation metadata.

20. The method of claim 17, wherein the multipart type indicator includes a Multipurpose Internet Mail Extensions ("MIME") type indicator.

* * * * *